Figure 1:
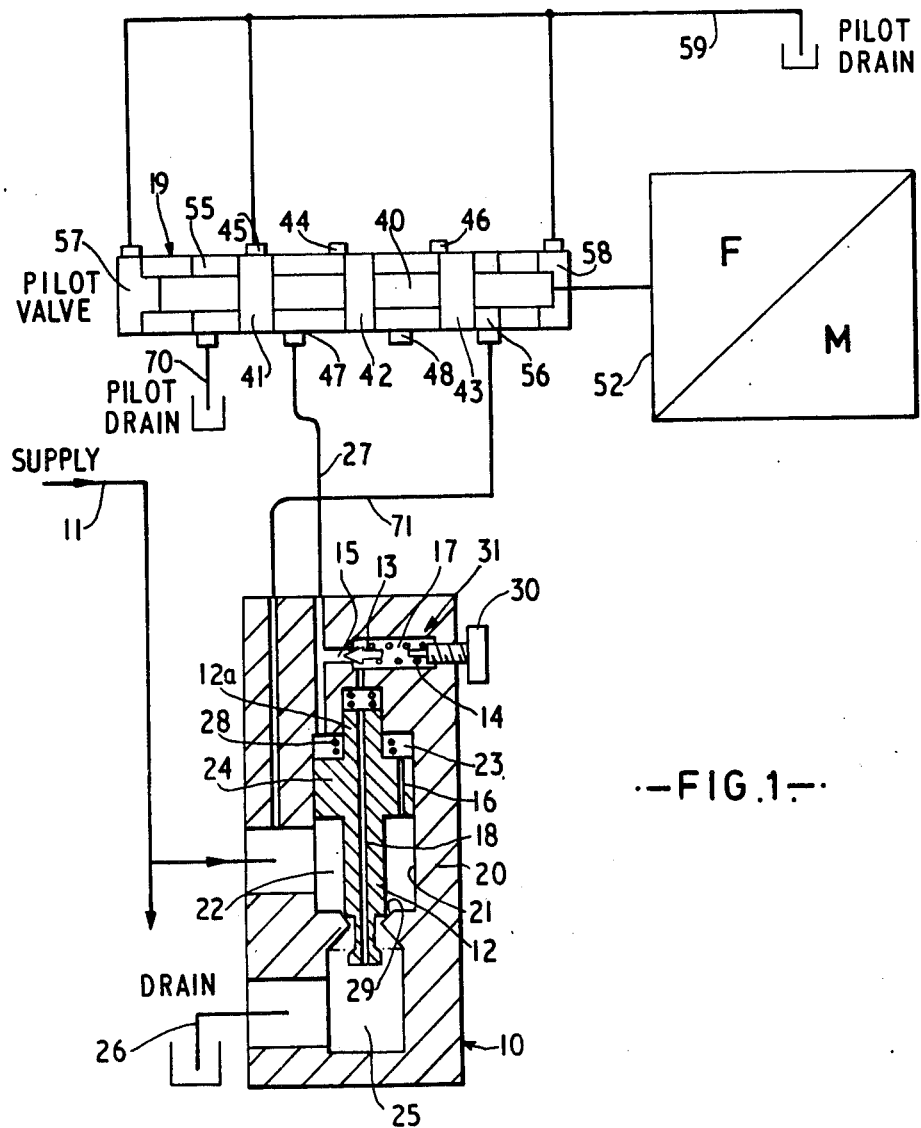

United States Patent [19]

Walters

[11] Patent Number: 4,619,186
[45] Date of Patent: Oct. 28, 1986

[54] PRESSURE RELIEF VALVES

[75] Inventor: Ronald B. Walters, Wembley, United Kingdom

[73] Assignee: Vickers, Incorporated, Troy, Mich.

[21] Appl. No.: 701,793

[22] Filed: Feb. 14, 1985

Related U.S. Application Data

[63] Continuation of Ser. No. 348,779, Feb. 16, 1982, abandoned, which is a continuation of Ser. No. 959,865, Nov. 13, 1978, abandoned.

[30] Foreign Application Priority Data

Sep. 3, 1977 [GB] United Kingdom ............... 36869/77

[51] Int. Cl.$^4$ .............................................. F15B 11/10
[52] U.S. Cl. .......................................... 91/433; 91/459
[58] Field of Search .................. 137/596.12, 491, 489; 251/30, 43; 91/433, 459, 450

[56] References Cited

U.S. PATENT DOCUMENTS

| | | | |
|---|---|---|---|
| 3,180,355 | 4/1965 | Long | 137/491 |
| 3,294,104 | 12/1966 | Mercier | 137/489 X |
| 3,613,717 | 10/1971 | Smith | 137/491 |
| 3,698,682 | 10/1972 | Berning et al. | 251/30 |
| 3,763,746 | 10/1973 | Walters | 91/433 |
| 3,878,765 | 4/1975 | Walters et al. | 91/433 |

FOREIGN PATENT DOCUMENTS

| | | | |
|---|---|---|---|
| 215749 | 6/1961 | Austria | 251/30 |
| 1109261 | 4/1968 | United Kingdom . | |
| 1406326 | 9/1975 | United Kingdom . | |

Primary Examiner—Robert E. Garrett
Assistant Examiner—Mark A. Williamson
Attorney, Agent, or Firm—Barnes, Kisselle, Raisch, Choate, Whittemore & Hulbert

[57] ABSTRACT

A pilot operated relief valve has a main relief valve (10) and a pilot relief valve (31) connected between a control chamber (23) and drain. A restriction (16) connects the control chamber (23) to the inlet chamber (22) which is separated from the control chamber by a piston (24) integral with the main relief valve closure member (12). Thus opening of the pilot relief valve against the adjustable force of a spring (14) determines the maximum pressure in the inlet chamber (22). The control chamber (23) can also be connected to drain (70) by a pilot valve (19) which is operated by a force motor (52) against pressure in a feedback chamber (56) connected to the inlet passage (22). The energization of the force motor (52) can be adjusted to adjust the relief pressure to a value below that at which the pilot relief valve (31) opens. Alternatively the pressure in the feedback chamber (56) can depend on the pressure at at least one side of a load fed via a directional valve from the inlet passage (22).

10 Claims, 5 Drawing Figures

-FIG.1-

—FIG.2—

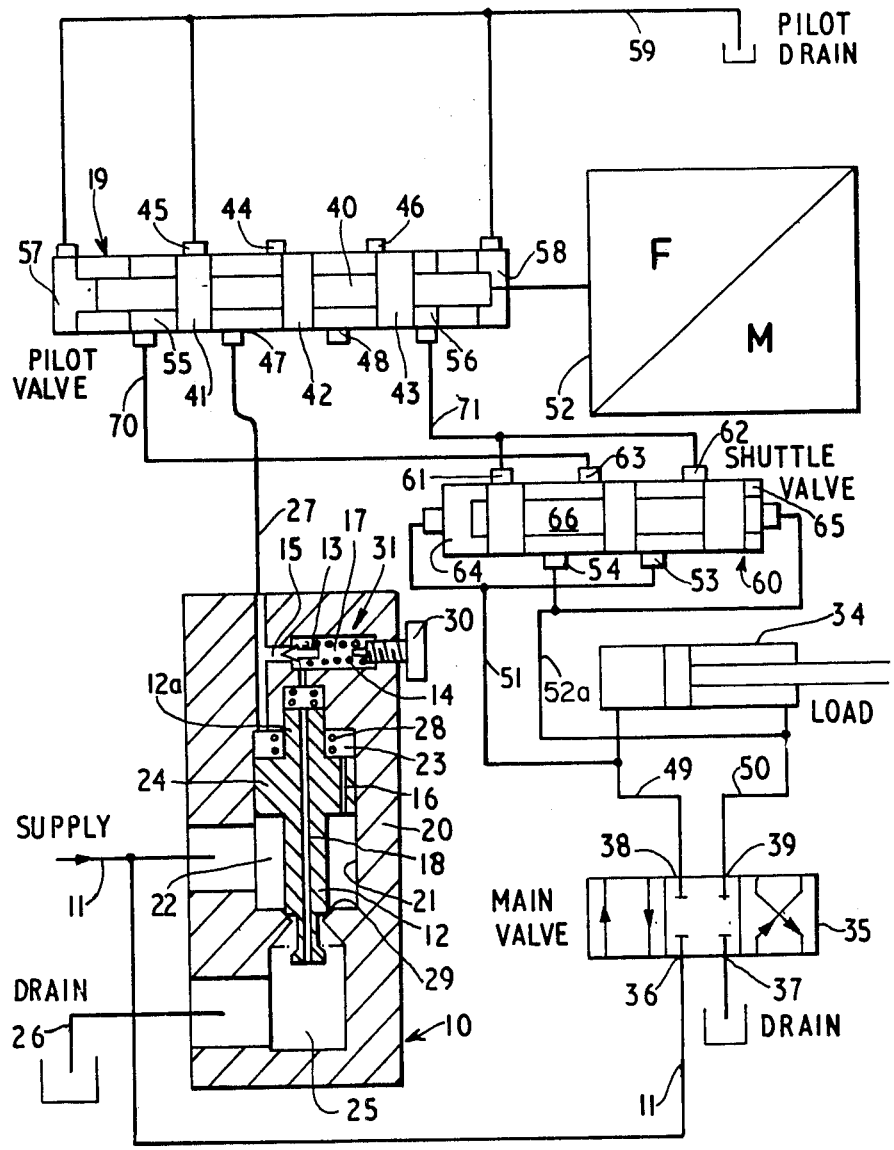
—FIG.4—

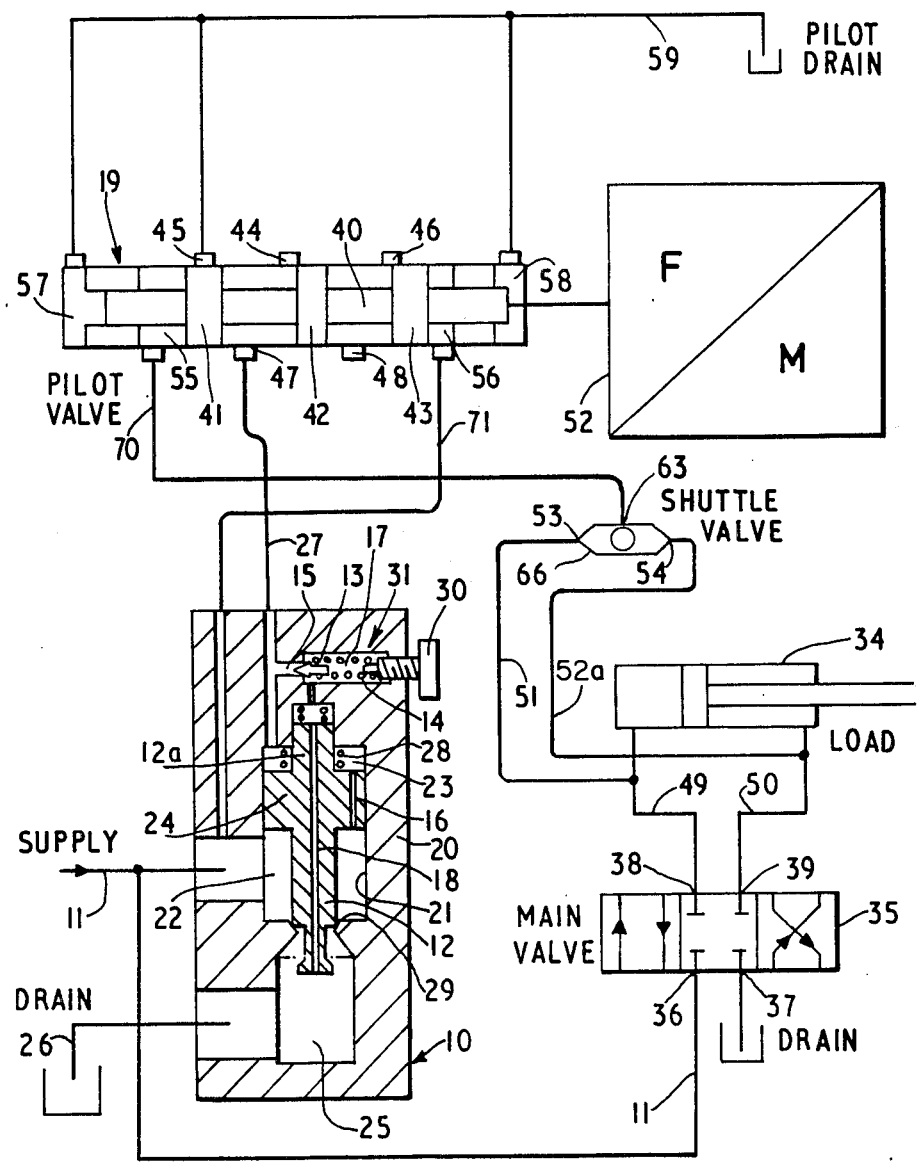
—FIG. 5.—

PRESSURE RELIEF VALVES

This application is a continuation, of application Ser. No. 348,779, filed Feb. 16, 1982, now abandoned, which is, in turn, a continuation of Ser. No. 959,865, filed Nov. 13, 1978, now abandoned.

The present invention relates to relief valve systems for fluids to be fed at a supply pressure to hydraulic devices and more particularly to a pilot operated relief valve system having a fluid-pressure operated main relief valve.

Commonly, as shown, for example, in U.S. Pat. No. 3,180,355, a piston integrally formed with the main relief valve closure member is subjected on one side to the supply pressure in the inlet chamber (i.e. to the pressure to be relieved) and on the other side to the pressure in a control chamber. The inlet chamber is connected to the control chamber via a restriction and the control chamber is connectible to drain via a pilot relief valve. When the desired supply pressure in the inlet chamber is reached, the pilot relief valve opens and the resulting fluid flow through the restriction creates a pressure drop across the piston, whereby the main relief valve is opened to connect the inlet chamber to the outlet chamber which is normally connected to drain.

In the pilot operated relief valve system described in British Pat. No. 1 109 261, the pilot relief valve is opened by the pressure in the control chamber acting against a spring and against the pressure in a back pressure chamber (the outlet chamber of the pilot relief valve). The spring force may be manually adjustable but to provide for the possibility of remote control, a control path extends from a fluid supply, e.g. the source of the supply pressure, to drain and comprises a second restriction and a servo valve operated by an electrical torque motor. A control pressure appears at the junction of the second restriction and the servo valve and this junction is connected to the back pressure chamber so that the second restriction lies in parallel with the pilot relief valve. When the servo valve is opened by the application of an electrical signal to the torque motor, the control pressure applied to the back pressure chamber is reduced, whereby the supply pressure at which the pilot relief valve, and thereby the main relief valve, opens is reduced. It is to be noted that, in the event of failure of the electrical circuitry, the servo valve will remain closed so that the supply pressure will not be limited unless a separate safety relief valve is provided.

A remotely controllable relief valve system which opens at a relatively low or minimum supply pressure in the event of absence of a controlling electrical signal is described in U.S. Pat. No. 3,613,717. However, the relief pressure is adjusted by adjusting the spring force of a pilot relief valve, analogously to the manual adjustment of the relief valve spring force in U.S. Pat. No. 3,180,355, but the spring force is varied by a servo piston controlled by a flapper valve. This system is complicated and requires a continuous supply of pilot fluid to operate the servo piston.

An object of the present invention is to provide a remotely controllable pressure relief valve system which has the fail-safe feature and which is of simplified construction and greater reliability and furthermore which is of wider versatility.

British Pat. No. 1 335 041 describes a flow control valve system with maximum pressure override. In such a system, a main valve is pressure-operated from a first pilot valve (flow control pilot) which is actuated by a first force motor against a flow feedback signal in the form of a pressure difference ($P_F$) representing the rate of flow of fluid to the hydraulic load. A second pilot valve (pressure control pilot) is connected in series with the flow control pilot and throttles the pilot fluid flow when a feedback pressure ($P_L$) dependent on the magnitude of the hydraulic load exceeds a predetermined value set by the energisation of a second force motor. The flow control system shown in this British Pat. No. 1 335 041 is thus able to limit the maximum pressure applied to the load via the main stage, thereby providing a form of pressure relief for the load. However, this British Patent contains no disclosure of any means enabling the supply pressure ($P_S$) to be relieved.

According to the present invention, a pressure relief valve system for a supply pressure comprises a piston operated main relief valve, one side of whose piston is exposed to an inlet chamber for the supply pressure to be relieved, the other side of which piston is exposed to a control chamber, and a control path leading from the inlet chamber to a drain, the control path containing a restriction and an electrically operated pilot valve, a control pressure for influencing the main relief valve being that prevailing between the restriction and the pilot valve, characterized in that the control chamber lies in said control path between the restriction and the pilot valve, and in that a feedback pressure, such feedback pressure being either the supply pressure or a pressure associated with a hydraulic device fed from the supply pressure, is applied to at least one feedback chamber of the pilot valve in opposition to the force produced by an electrical force motor.

In the absence of an electrical signal, the pressure to be controlled displaces the pilot valve to connect the control chamber to drain, whereby the main relief valve is immediately opened.

Whilst in some embodiments of the invention, the fluid pressure to be controlled is the inlet pressure to the relief valve, in another embodiment of the invention, the force motor acts against a pressure difference which is the pressure difference across a load being actuated by means of a suitable control valve from the source of supply pressure.

By this last measure the supply pressure is limited to a value not substantially in excess of that required to work against the load (pressure adaptation).

Thus greater versatility is achieved in that the relief valve system according to the invention can be used for controlling pressure or for pressure adaptation.

Figure 2:
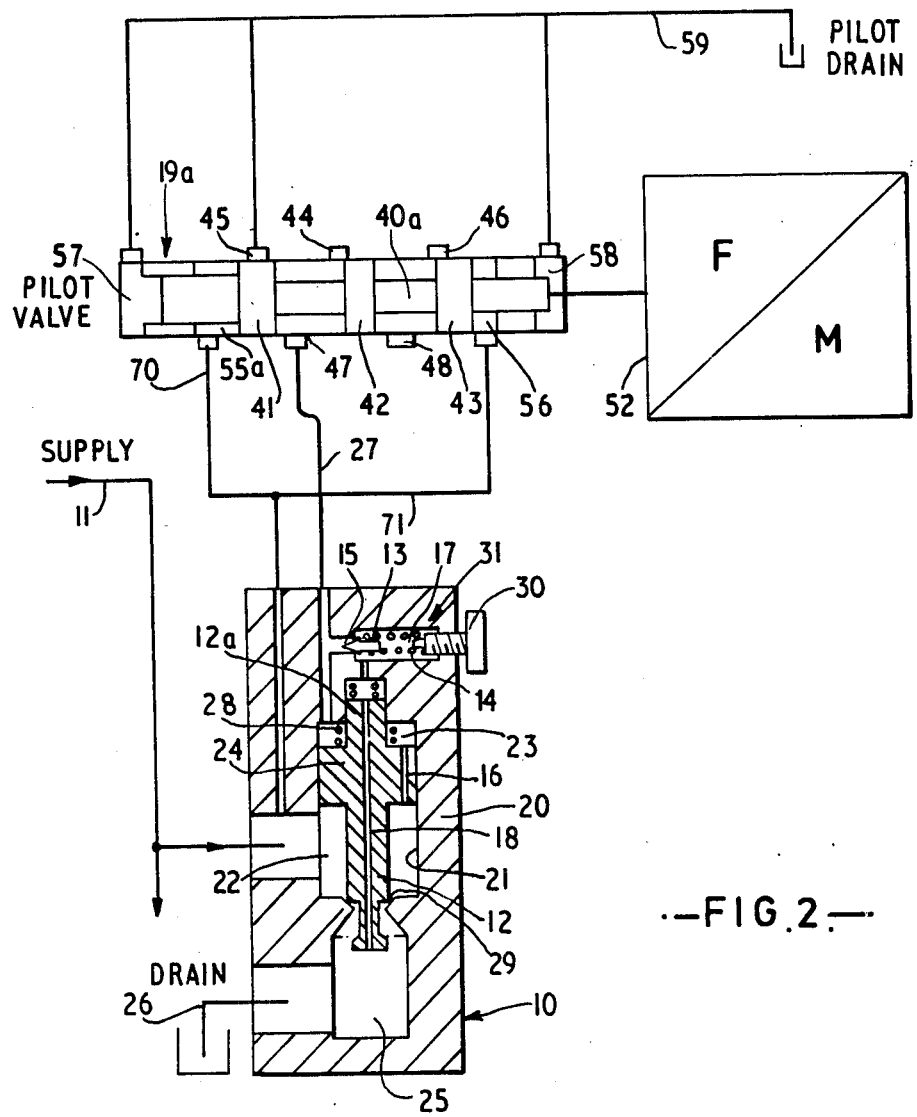
Figure 3:
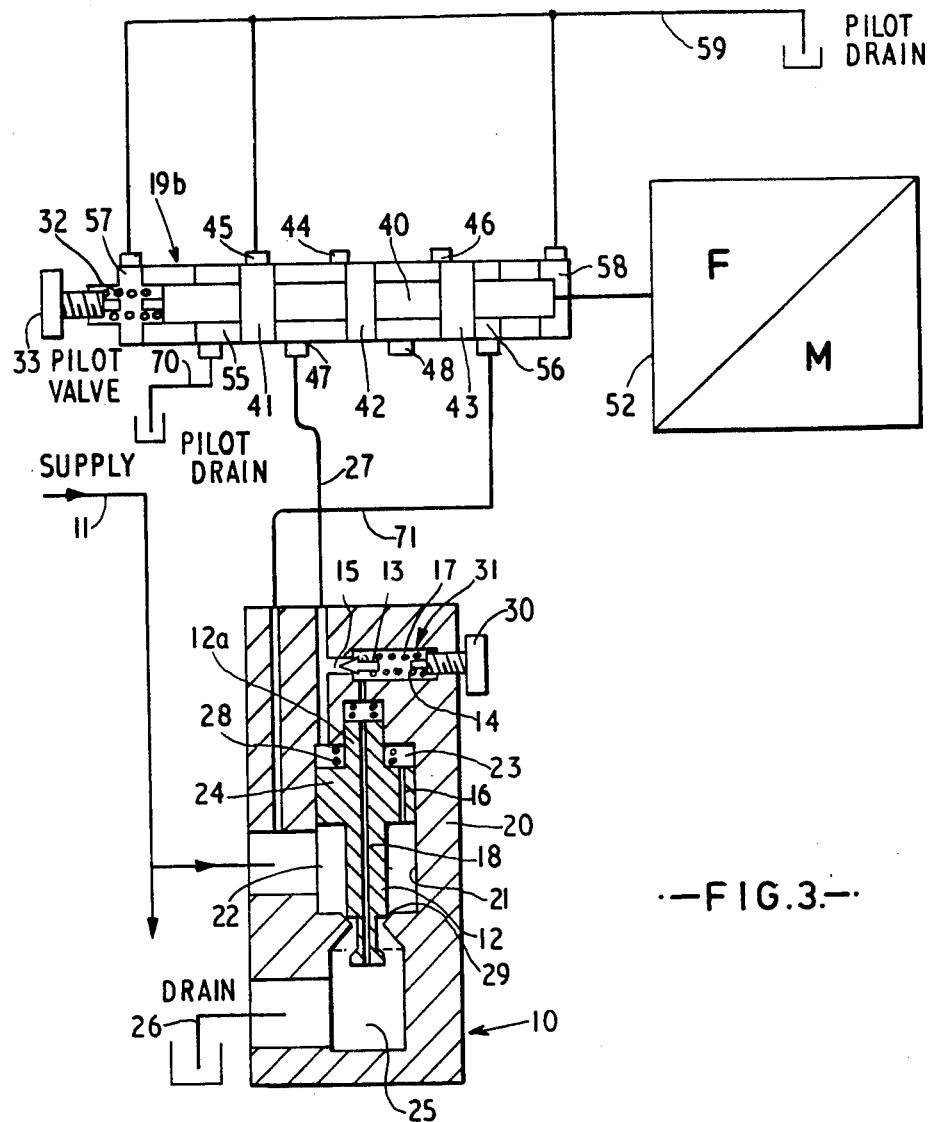

The invention is further described, by way of example, with reference to the accompanying drawings, in which:

FIG. 1 is a flow diagram of a remotely operable, pilot operated relief valve system in accordance with one embodiment of the invention, FIGS. 2 and 3 are similar flow diagrams of two further embodiments, FIG. 4 is a flow diagram of a pilot operated relief valve system whose opening pressure is adjustable in accordance with a load connected to the source of pressure fluid, and FIG. 5 is a similar flow diagram of another embodiment. Similar to that of FIG. 4.

Referring to FIG. 1, the supply pressure in a supply line 11, leading to a hydraulic load (not shown) is limited by a pilot operated relief valve system having a main stage 10. The housing 20 of the main stage 10 contains a valve seat 29 with which a main relief valve closure member 12 co-operates. An operating piston 24 integrally formed with the closure member 12 is slidable in a cylinder bore 21 in the housing 20 and divides the latter into an inlet chamber 22 and a control chamber 23. An extension 12a on the closure member 12 is slidable in a reduced diameter bore in the housing 20 and is of the same diameter as the valve seat 29 so that opposite sides of the piston 24 are of equal effective area, opposite end faces of the closure member 12 being interconnected by a bore 18. The outlet chamber 25 of the main stage 10 is connected via a line 26 to drain. A restriction 16 in the piston 24 connects the control chamber 23 to the inlet chamber 22 so that, in the absence of any fluid flow out of the control chamber 23, the pressures on opposite sides of the piston 24 are equal and a spring 28 in the control chamber 23 holds the closure member 12 in its closed position illustrated.

A control line 27 connects the control chamber 23 to a control port 47 of a pilot valve 19. The pilot valve 19 has a valve spool 40 which is provided with three lands 41, 42 and 43 controlling fluid communication between ports 44, 45 and 46 on the one hand and control ports 47 and 48 on the other hand. The port 45 is connected to drain via a line 59. Whilst the pilot valve 19 is shown as a five-port valve, only two of the ports are used. Thus the ports 44, 46 and 48 are shown blanked off although they may all three be connected to the control port 47. The pilot spool 40 can be displaced from its neutral position by means of a linear force motor 52 which is adapted to produce a force directly proportional to the electrical current fed thereto. The armature of the force motor is supported on diaphragms which act as centering springs for the pilot valve spool 40.

The pilot valve 19 has annular feedback chambers 55 and 56 at the sides of the lands 41 and 43 facing the respective ends of the spool 40. Chambers 57 and 58 at the ends of the spool 40 are connected to the drain line 50. A feedback line 71 connects the pressure to be controlled (that is, the supply pressure in the relief valve inlet chamber 22 in this embodiment), to the feedback chamber 56 and the feedback chamber 55 is connected by a line 70 to pilot drain.

The supply pressure at which the relief valve system opens is determined by the current fed to the force motor 52, the latter being energised to urge the pilot spool 40 to the right, as shown, from its neutral position. Thus the port 45 is closed off so that the pressure in the control chamber 23 follows the build-up of supply pressure in the inlet chamber 22 and the closure member 12 remains closed. The pressure in the feedback chamber 56 also follows the build-up of supply pressure and applies a feedback force to the spool 40 in opposition to the input force from the force motor 52. When the feedback force on the spool 40 exceeds the input force the spool is displaced to the left until the port 47 is connected to the port 45. This allows fluid to flow through the restriction 16, the line 27, the pilot valve 19 and the line 59 to drain. The resulting pressure drop in the restriction 16 is applied to the piston 24 to lift the closure member 12 from its seat 29 and to connect the inlet chamber 22 to drain. The pressure in the supply line 11 is thus limited to a value determined by the energization of the force motor 52 and this value can be adjusted remotely from the relief valve system by adjustment of the energizing current.

Should no signal be applied to the force motor, e.g. because of an electrical fault, the supply pressure immediately displaces the pilot spool 40 to the left to relieve the control chamber 23, whereby the supply pressure acting on the piston 24 can open the main relief valve and prevent a build-up of pressure above a relatively low or residual valve.

A conventional pilot relief valve 31 is also provided in the illustrated embodiments and comprises a closure member 13 which is urged against a valve seat 15 by a spring 14 disposed in a valve chamber 17. The valve seat 15 is connected to the line 27 and thereby to the control chamber 23 and the valve chamber 17 is connected to drain via the passage 18 which extends through the main closure member 12. The pilot relief valve 31 provides a maximum pressure override in that, when sufficient pressure is applied to the pilot closure member 13 to overcome the force of the spring 14 the closure member 13 is lifted from its seat 15 to connect to drain whereby the main valve is opened. The force of the spring 14 can be adjusted by means of a spring abutment screw 30.

Since the pressure to be controlled acts against the force of the force motor 52, the latter has to be designed to produce a very large force unless the effective area of the land 43 is made very small. One way of reducing this difficulty is to connect the line 70 to a source of fixed or adjustable reference pressure instead of to drain. Thus the force of the force motor has only to be balanced by the force due to difference between the pressure to be controlled and the reference pressure.

Another possibility is to make the left hand end of the pilot spool 40a of the pilot valve 19a of slightly larger diameter than its right hand end and to connect the line 70 between the line 71 and the feedback chamber 55, as shown in FIG. 2. The effective area of the annular feedback chamber 56 is thereby slightly greater than that of the annular feedback chamber 55a. It is easier to achieve close manufacturing tolerances on the difference between the sizes of the feedback chambers 55 and 56 than on the actual size of its feedback chamber 56, if the latter were made very small.

In FIG. 2, parts like those of FIG. 1 are denoted by like reference numerals. In operation, the force of the force motor 52 is balanced by the difference between the forces applied to the pilot spool 40a by the supply pressure in the two feedback chambers 56 and 55a. Otherwise the embodiment of FIG. 2 operates in the same way as that of FIG. 1.

A further possibility is shown in FIG. 3 wherein parts like those of FIGS. 1 and 2 are denoted by like reference numerals. In the FIG. 3 embodiment, the force due to the supply pressure in the feedback chamber 56 and acting to the left on the pilot spool 40 of the pilot valve 19b is opposed by a spring 32 which is disposed in the chamber 57 and which is adjustably supported by a screw 33. Thus the force motor 52 has only to act against the difference between the feedback force due to the pressure in the chamber 56 and the force of the spring 32.

If the force motor 52 is made bi-directional, the range of adjustment of the inlet pressure at which the relief valve system opens can be doubled for a given magnitude of the maximum force of the force motor and for a given setting of the screw 33.

It should be mentioned that, with the embodiment of FIG. 3 and with the modification to the embodiment of FIG. 1 wherein a reference pressure is applied to the feedback chamber 55, the supply pressure will not fall below a value determined by the force of the spring 32 or the reference pressure in the event of absence of the electrical input signal.

In the modification of the invention shown in FIG. 4 the main relief valve 10, the pilot valve 19 and the pilot relief valve 31 are of the same construction as in the embodiment of FIG. 1 and again like parts are denoted by like reference numerals. However, the force of the force motor 52 is opposed not by a force dependent upon the supply pressure in the supply line 11 but by the pressure drop across a hydraulic load 34 which is controlled by a main valve 35. Thus the supply line 11 leads to a supply port 36 of the main valve 35 which has a drain port 37 connected to drain. Two service ports 38 and 39 of the main valve 35 are connected to respective lines 49 and 50 to opposite sides of the load 34.

Feedback lines 51 and 52a are connected to respective inlet ports 53 and 54 of a shuttle valve 60. Outlet ports 61 and 62 of the shuttle valve 60 are connected by the line 71 to the feedback chamber 56 and an outlet port 63 is connected by the line 70 to the feedback chamber 55. The lines 51 and 52a are also connected to operating chambers 64 and 65, respectively, of the shuttle valve 60 so that the spool 66 of the shuttle valve 60 is switched to the position in which the line 71 is always connected to that one of the two lines 49 and 50 which is at the higher pressure. The shuttle valve 60 therefore ensures that the pressure difference across the load 34 is always applied in the same direction to the pilot spool 40, irrespective of the direction of operation of the load 34.

In the embodiment of FIG. 4, the direction of movement of the load 34 depends upon the direction of operation of the main valve 35, which is a directional valve. The maximum pressure drop across the load is determined by the magnitude of the energizing current fed to the force motor 52 since this pressure drop constitutes the pressure to be controlled which is fed back to the pilot valve 19 to control the opening of the main relief valve 10 accordingly.

The setting of the spring 14 by means of the spring abutment screw 30 determines the maximum supply pressure in the line 11.

The means for operating the main valve 35 are not shown. Such means may comprise a lever or a pilot valve. Thus the main valve 35 can be directly manually operable or may be pilot operated as described in British Patent Specification No. 1 406 326.

The embodiment of FIG. 5 is very similar to that of FIG. 4 and again like parts are denoted by like reference numerals. In FIG. 5, the shuttle valve 60 of FIG. 4 is replaced by a simple two-way non-return or shuttle valve 66 whose inlet ports 53 and 54 are connected by the lines 51 and 52a to the load lines 49 and 50 and whose medial outlet port 63 is connected by the line 70 to the feedback chamber 55. The feedback chamber 56 is connected by the line 70 to the inlet chamber 22 as in the embodiment of FIG. 1. Thus, the pilot-operated relief valve system of FIG. 5 has a variable pressure-match circuit in which the difference between the supply pressure and the higher of the two load pressures is fed back and balanced by the force produced by the force motor 52.

In the embodiment of FIG. 5, the relief valve main stage 10 is operated to maintain the pressure drop across the main valve 35 at a predetermined value, irrespective of load variations. This pressure drop is determined by the input current to the force motor 52 and the input current can be programmed to conform to the flow-pressure characteristics of the main valve 35.

Normally it is desirable for the pump to be unloaded when the actuator 34 is at rest and this can be accomplished by applying a negative signal to the force motor 52.

In each of the illustrated embodiments, there is a closed pressure feedback loop comprising at least the feedback line 71 leading to the feedback chamber 56.

It is preferred to use the five port pilot valve 19 rather than a simple two port valve since the pilot valve constructed and manufactured for use in the control device described in British Pat. No. 1 406 326 can then also be used as the pilot valve in the relief valve system of the present invention.

I claim:

1. A hydraulic relief valve system for controlling the supply pressure of a hydraulic supply line extending unrestrictedly from a hydraulic supply to a hydraulic load comprising
   a main relief valve,
   a pilot valve having a control port and a drain port for controlling the supply pressure in said supply line,
   said main relief valve comprising a housing having a valve seat, a closure member cooperating with the said seat and a piston attached to said closure member, said piston in said housing defining an inlet chamber connected to said supply line and a control chamber,
   said housing and closure member forming an outlet chamber,
   a hydraulic return line extending from said outlet chamber to a drain,
   a hydraulic passage extending between said control chamber and inlet chamber and defining a control path,
   said control path having a restriction therein,
   a control line extending between said control chamber and said control port of said pilot valve for applying a control pressure to said control chamber which pressure is the pressure prevailing between the restriction and said pilot valve, and
   an electric force motor for operating said pilot valve,
   said pilot valve having at least one feedback chamber to which pressure is applied from said supply pressure or a pressure associated with the hydraulic device to which supply pressure is applied, said pressure to said feedback chamber being opposed to the force produced by said electric force motor and acting in a direction to connect said control port to said drain port.

2. In a hydraulic system having a supply line, means for supplying hydraulic fluid under pressure to said supply line, a hydraulic load and means for controllably connecting said load to said supply line, and a drain; servo-controlled relief valve means for relieving said supply line to drain and with a high degree of steady state accuracy and good dynamic performance, said relief valve means comprising a piston-operated main relief valve, a piston, an inlet chamber for supply pressure, one side of said piston being exposed to the supply pressure to be relieved, a control chamber on the other side of said piston, and a control path leading from the inlet chamber to a drain, the control path containing a restriction and an electrically operated pilot valve having at least one feedback chamber, a control pressure for influencing the main relief valve being that prevailing between the restriction and said pilot valve, and an electrical force motor characterized in that the control chamber lies in said control path between the restriction and said pilot valve, and in that a feedback pressure, such feedback pressure being either the supply pressure or a pressure associated with a hydraulic device fed from the supply pressure, is applied to said feedback chamber of said pilot valve in opposition to the force produced by said electrical force motor.

3. A relief valve system according to claim 2, in which the feedback pressure is the supply pressure applied from a supply line via a branch line to the feedback chamber.

4. A relief valve system according to claim 3, in which the pilot valve has a second feedback chamber opposed to said first feedback chamber, the force motor means acts against the net force produced by the supply pressure applied via said branch line to opposed differential area feedback chambers.

5. A relief valve system according to claim 3, in which the force motor is assisted by a spring.

6. A relief valve system according to claim 2, in which the pilot valve has a second feedback chamber opposed to said first feedback chamber, the force motor acts against a force dependent on the pressure difference between load lines connected to opposite sides of a hydraulic load fed from the supply pressure, which pressure difference is applied via lines to opposed feedback chambers of the pilot valve.

7. A relief valve system according to claim 3, in which the force motor acts against a force dependent on the difference between the supply pressure and the pressure at one side of a hydraulic load fed from the supply pressure, which pressure difference is applied via lines to opposed feedback chambers of the pilot valve.

8. A relief valve system according to claim 6 or 7, in which a shuttle valve is interposed between the lines and at least the line to the pilot valve feedback chamber.

9. A relief valve system according to claim 2, in which the pilot valve is constructed as a five-port valve of which only two ports are used.

10. A relief valve system according to claim 2, in which a spring-loaded pilot relief valve is connected between the control chamber and drain.

* * * * *